United States Patent
Honjo et al.

(10) Patent No.: US 8,535,626 B1
(45) Date of Patent: Sep. 17, 2013

(54) EXHAUST GAS TREATMENT APPARATUS AND EXHAUST GAS TREATMENT METHOD

(71) Applicant: Mitsubishi Heavy Industries, Ltd., Tokyo (JP)

(72) Inventors: Shintaro Honjo, New York, NY (US); Satoru Sugita, New York, NY (US)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/687,716

(22) Filed: Nov. 28, 2012

(51) Int. Cl.
| | | |
|---|---|---|
| B01D 53/34 | (2006.01) | |
| B01D 53/50 | (2006.01) | |
| B01D 53/56 | (2006.01) | |
| B01D 53/64 | (2006.01) | |
| B01D 53/68 | (2006.01) | |
| B01D 53/74 | (2006.01) | |
| B01D 53/75 | (2006.01) | |
| B01D 53/78 | (2006.01) | |
| G05B 21/00 | (2006.01) | |
| G05B 1/00 | (2006.01) | |

(52) U.S. Cl.
USPC ............ 423/210; 423/239.1; 423/240 R; 423/243.01; 423/555; 423/DIG. 5; 422/108; 422/111; 422/168; 422/169; 422/170; 422/171; 422/172; 422/187; 700/266

(58) Field of Classification Search
USPC .......... 423/210, 239.1, 240 R, 243.01, 555, 423/DIG. 5; 422/108, 111, 168, 169, 170, 422/171, 172, 187; 700/266
See application file for complete search history.

(56) References Cited

U.S. PATENT DOCUMENTS

| | | | | |
|---|---|---|---|---|
| 4,123,355 | A | * 10/1978 | Poradek et al. | 210/50 |
| 2002/0155038 | A1 | * 10/2002 | Ohi et al. | 422/170 |
| 2011/0268637 | A1 | 11/2011 | Ukai et al. | |

FOREIGN PATENT DOCUMENTS

| | | | |
|---|---|---|---|
| EP | 2 444 143 A1 | 4/2012 | |
| EP | 2 444 144 A1 | 4/2012 | |
| JP | 02-211217 A | 8/1990 | |
| JP | 2-298315 A | * 12/1990 | |
| JP | 10-128055 A | 5/1998 | |
| JP | 2002-224533 A | 8/2002 | |
| WO | 2010/146670 A1 | 12/2010 | |
| WO | 2010/146671 A1 | 12/2010 | |
| WO | 2010/146672 A1 | 12/2010 | |
| WO | 2011/104841 A1 | 9/2011 | |
| WO | 2012/128257 A1 | 9/2012 | |

* cited by examiner

*Primary Examiner* — Timothy Vanoy
(74) *Attorney, Agent, or Firm* — Westerman, Hattori, Daniels & Adrian, LLP (57) ABSTRACT

An exhaust gas treatment apparatus according to the present invention generates post-mercury oxidation exhaust gas by denitrating exhaust gas of a combustion apparatus, generates desulfurization drainage by desulfurizing the post-mercury oxidation exhaust gas, supplies the desulfurization drainage to the combustion apparatus, and controls a return amount, which is the amount of the desulfurization drainage reused for the desulfurization, based on a concentration of halogens in the desulfurization drainage. Such exhaust gas treatment apparatus can appropriately remove mercury from the exhaust gas, and can desulfurize the post-mercury oxidation exhaust gas more appropriately.

14 Claims, 2 Drawing Sheets

EXHAUST GAS TREATMENT APPARATUS AND EXHAUST GAS TREATMENT METHOD

TECHNICAL FIELD

The present invention relates to an exhaust gas treatment apparatus and an exhaust gas treatment method and, in particular, to an exhaust gas treatment apparatus and an exhaust gas treatment method that remove nitrogen oxides and mercury contained in exhaust gas.

BACKGROUND ART

There has been known an exhaust gas treatment apparatus that removes mercury from exhaust gas using a denitration apparatus and a wet desulfurization apparatus. At this time, the denitration apparatus reduces nitrogen oxide $NO_x$ contained in the exhaust gas to nitrogen, and oxidizes elemental mercury contained in the exhaust gas to water-soluble mercury using hydrogen chloride HCl contained in the exhaust gas. The wet desulfurization apparatus desulfurizes the denitrated exhaust gas, and removes the oxidized mercury from the denitrated exhaust gas (refer to PTLs 1, 2, and 3).

In such exhaust gas treatment apparatus, since desulfurization drainage that the wet desulfurization apparatus drains contains chlorine, desulfurization drainage is further supplied to fuel for a boiler or inside a furnace of the boiler, thereby a supply amount, which is the amount of chlorine supplied from the outside of a system, the chlorine oxidizing elemental mercury, can be reduced, and a discharge amount, which is the amount of the desulfurization drainage discharged to the system, can be reduced.

In PTL 4, an exhaust gas treatment system is disclosed in which desulfurization drainage is directly sprayed into a path to supply fuel to a boiler and a furnace of the boiler.

In PTL 5, a wet flue-gas desulfurization apparatus is disclosed in which a percentage of moisture content in gypsum collected from an absorbing liquid is adjusted according to an amount of chlorine absorbed in the absorbing liquid that is previously calculated depending on a load of a combustion apparatus, a type of fuel to be used, and a property of exhaust gas, and thereby a chlorine concentration in the absorbing liquid is suppressed to not more than a predetermined value.

In PTL 6, a flue-gas desulfurization apparatus is disclosed in which filtrate obtained by separating gypsum from gypsum slurry generated from an absorbing liquid joins the absorbing liquid.

In PTL 7, a wet flue-gas desulfurization apparatus is disclosed in which a supernatant liquid of slurry is electrolyzed into chlorine gas or hydrogen chloride gas, a chlorine concentration of the slurry is adjusted to a predetermined concentration, and the slurry is circulated through an absorption tower.

CITATION LIST

Patent Literature

PTL 1
PCT International Publication No. WO 2010/146670
PTL 2
PCT International Publication No. WO 2010/146671
PTL 3
PCT International Publication No. WO 2010/146672
PTL 4
PCT International Publication No. WO 2011/104841
PTL 5
Japanese Unexamined Patent Application, Publication No. 2002-224533
PTL 6
Japanese Unexamined Patent Application, Publication No. Hei 10-128055
PTL 7
Japanese Unexamined Patent Application, Publication No. Hei 02-211217

SUMMARY OF INVENTION

Technical Problem

In such exhaust gas treatment apparatus, in some cases, when sufficient chlorine to oxidize mercury contained in exhaust gas is supplied to a denitration apparatus, hydrogen chloride is supplied to a wet desulfurization apparatus together with the exhaust gas, a concentration of chlorine in an absorbing liquid of the wet desulfurization apparatus increases, and thereby the exhaust gas cannot be appropriately desulfurized.

An object of the present invention is to provide an exhaust gas treatment apparatus and an exhaust gas treatment method that appropriately desulfurize exhaust gas, and appropriately remove mercury from the exhaust gas.

Solution to Problem

An exhaust gas treatment apparatus according to the present invention is provided with: a mercury oxidation apparatus; a wet desulfurization apparatus; a separation apparatus; a first desulfurization drainage supply apparatus; a second desulfurization drainage supply apparatus; a halogen concentration sensor; and a control apparatus. The mercury oxidation apparatus oxidizes mercury in combustion apparatus exhaust gas generated by a combustion apparatus. When a wet limestone-gypsum method is used, the wet desulfurization apparatus removes sulfur oxides together with oxidized mercury from the exhaust gas, and generates gypsum slurry. The separation apparatus generates gypsum and desulfurization drainage from the slurry. The first desulfurization drainage supply apparatus supplies the desulfurization drainage to the combustion apparatus. The second desulfurization drainage supply apparatus supplies the desulfurization drainage to the wet desulfurization apparatus. The halogen concentration sensor measures a halogen concentration, which is the concentration of halogens contained in filtrate generated by the slurry being filtered. The control apparatus controls the second desulfurization drainage supply apparatus so that a supply amount, which is the amount of the desulfurization drainage supplied to the wet desulfurization apparatus, changes based on the halogen concentration. The combustion apparatus generates combustion apparatus exhaust gas by combusting fuel together with the desulfurization drainage. The combustion apparatus exhaust gas contains mercury oxidized by contained halogens, and is removed by the wet desulfurization apparatus using an absorbing liquid with which the desulfurization drainage has been mixed.

Such exhaust gas treatment apparatus can oxidize elemental mercury contained in the combustion apparatus exhaust gas using halogens by the mercury oxidation apparatus, and can remove the oxidized mercury from the exhaust gas by the wet desulfurization apparatus. The desulfurization drainage contains halogens. Therefore, such exhaust gas treatment apparatus supplies desulfurization drainage to the combustion apparatus, thereby can supply halogens to the mercury oxidation apparatus, and thus can reduce a supply amount, which is the amount of halogens separately supplied from the outside of the system to the mercury oxidation apparatus. Furthermore, such exhaust gas treatment apparatus changes the supply amount, which is the amount of desulfurization drainage supplied to the wet desulfurization apparatus, based on the halogen concentration, thereby can adjust more appropriately the concentration of halogens in the absorbing liquid of the wet desulfurization apparatus, and thus can desulfurize the exhaust gas more appropriately.

The control apparatus controls the first desulfurization drainage supply apparatus so that a supply amount, which is the amount of the desulfurization drainage supplied to the combustion apparatus, changes based on the halogen concentration.

Such exhaust gas treatment apparatus changes the supply amount, which is the amount of desulfurization drainage supplied to the combustion apparatus, based on the halogen concentration, thereby can appropriately adjust the concentration of halogens in the combustion apparatus exhaust gas, can appropriately oxidize the elemental mercury contained in the combustion apparatus exhaust gas, and thus can appropriately remove mercury from the combustion apparatus exhaust gas.

The separation apparatus is provided with: a filtration apparatus that generates filtrate and pre-cleaning gypsum by filtering the slurry; a cleaning apparatus that generates cleaning water drainage and gypsum by cleaning the pre-cleaning gypsum using cleaning water; and a drainage container that generates desulfurization drainage by mixing the cleaning water drainage and the filtrate. The control apparatus controls the cleaning apparatus so that an amount of cleaning water utilized per unit amount of the pre-cleaning gypsum changes based on the halogen concentration.

Such exhaust gas treatment apparatus changes the amount of cleaning water utilized for cleaning the unit amount of pre-cleaning gypsum based on the halogen concentration, thereby can control an amount of halogens discharged to the outside of the system together with gypsum, and thus can maintain an amount of halogens in the system substantially constant.

The mercury oxidation apparatus is provided with: a denitration apparatus that generates post-denitration exhaust gas by denitrating the combustion apparatus exhaust gas; a non-drainage apparatus that generates halide salt containing exhaust gas by supplying the desulfurization drainage to a flue into which the post-denitration exhaust gas flows; and a dust collection apparatus that removes dust from the halide salt containing exhaust gas. The elemental mercury contained in the combustion apparatus exhaust gas is oxidized by the denitration apparatus using halogens contained in the combustion apparatus exhaust gas. The control apparatus further controls the non-drainage apparatus so that a supply amount, which is the amount of the desulfurization drainage supplied to the flue, changes based on the halogen concentration.

Such exhaust gas treatment apparatus can discharge halogens to the outside of the system together with the dust, changes the supply amount, which is the amount of the desulfurization drainage supplied to the flue, based on the halogen concentration, thereby can appropriately adjust a discharge amount, which is the amount of halogens discharged to the outside of the system, and thus can maintain the amount of halogens in the system substantially constant.

The exhaust gas treatment apparatus according to the present invention is further provided with a halogen supply apparatus that adds halogens to the desulfurization drainage. The control apparatus controls the halogen supply apparatus so that an addition amount, which is the amount of halogens added to the desulfurization drainage, changes based on the halogen concentration.

Such exhaust gas treatment apparatus can appropriately supply halogens in the system, and can maintain the halogen concentration substantially constant.

The exhaust gas treatment apparatus according to the present invention is further provided with a mercury concentration sensor that measures a mercury concentration, which is the concentration of mercury contained in the post-desulfurization exhaust gas. At this time, the control apparatus controls the second desulfurization drainage supply apparatus further based on the mercury concentration.

Such exhaust gas treatment apparatus can change the concentration of halogens contained in the combustion apparatus exhaust gas, and can remove mercury from the combustion apparatus exhaust gas more reliably.

The exhaust gas treatment apparatus according to the present invention is further provided with another halogen concentration sensor that measures a concentration of halogens contained in the post-mercury oxidation exhaust gas. At this time, the control apparatus controls the second desulfurization drainage supply apparatus further based on the halogen concentration.

Such exhaust gas treatment apparatus can change the concentration of halogens contained in the combustion apparatus exhaust gas, and can remove mercury from the combustion apparatus exhaust gas more reliably.

The exhaust gas treatment method according to the present invention is executed using the exhaust gas treatment apparatus. The exhaust gas treatment apparatus is provided with: the mercury oxidation apparatus; the wet desulfurization apparatus; the separation apparatus; the first desulfurization drainage supply apparatus; the second desulfurization drainage supply apparatus; the halogen concentration sensor; and the control apparatus. The mercury oxidation apparatus generates exhaust gas containing mercury that is oxidized from the combustion apparatus exhaust gas generated by the combustion apparatus. The wet desulfurization apparatus desulfurizes the exhaust gas, and generates gypsum slurry. The separation apparatus generates gypsum and desulfurization drainage from the slurry. The first desulfurization drainage supply apparatus supplies the desulfurization drainage to the combustion apparatus. The second desulfurization drainage supply apparatus supplies the desulfurization drainage to the wet desulfurization apparatus. The combustion apparatus generates combustion apparatus exhaust gas by combusting fuel together with the desulfurization drainage. The post-mercury oxidation exhaust gas contains mercury oxidized by halogens contained in the combustion apparatus exhaust gas, and is desulfurized by the wet desulfurization apparatus using the absorbing liquid with which the desulfurization drainage has been mixed. At this time, the exhaust gas treatment method according to the present invention includes: measuring a halogen concentration, which is the concentration of halogens contained in filtrate generated by the slurry being filtered; and controlling the second desulfurization drainage supply apparatus so that a supply amount, which is the amount of the desulfurization drainage supplied to the wet desulfurization apparatus, changes based on the halogen concentration.

Such exhaust gas treatment apparatus can oxidize elemental mercury contained in the combustion apparatus exhaust gas using halogens by the mercury oxidation apparatus, and can remove the oxidized mercury from the post-mercury oxidation exhaust gas by the wet desulfurization apparatus. The desulfurization drainage contains halogens. Therefore, such exhaust gas treatment apparatus supplies desulfurization drainage to the combustion apparatus, thereby can supply halogens to the mercury oxidation apparatus, and thus can reduce a supply amount, which is the amount of halogens separately supplied from the outside of the system to the mercury oxidation apparatus. According to such exhaust gas treatment method, the exhaust gas treatment apparatus changes the supply amount, which is the amount of desulfurization drainage supplied to the wet desulfurization apparatus, based on the halogen concentration, thereby can adjust more appropriately the concentration of halogens in the absorbing liquid of the wet desulfurization apparatus, and thus can desulfurize the post-mercury oxidation exhaust gas more appropriately.

The exhaust gas treatment method according to the present invention further includes controlling the first desulfurization drainage supply apparatus so that the supply amount, which is the amount of the desulfurization drainage supplied to the combustion apparatus, changes based on the halogen concentration.

According to such exhaust gas treatment method, the exhaust gas treatment apparatus changes the supply amount, which is the amount of desulfurization drainage supplied to the combustion apparatus, based on the halogen concentration, thereby can appropriately adjust the concentration of halogens in the combustion apparatus exhaust gas, can appropriately oxidize the elemental mercury contained in the combustion apparatus exhaust gas, and thus can appropriately remove mercury from the combustion apparatus exhaust gas.

The separation apparatus is provided with: the filtration apparatus that generates filtrate and pre-cleaning gypsum by filtering the slurry; the cleaning apparatus that generates cleaning water drainage and gypsum by cleaning the pre-cleaning gypsum using cleaning water; and the drainage container that generates desulfurization drainage by mixing the cleaning water drainage and the filtrate. At this time, the exhaust gas treatment method according to the present invention further includes controlling the cleaning apparatus so that an amount of the cleaning water utilized per unit amount of the pre-cleaning gypsum changes based on the halogen concentration.

According to such exhaust gas treatment method, the exhaust gas treatment apparatus changes the amount of cleaning water utilized for cleaning the unit amount of pre-cleaning gypsum based on the halogen concentration, thereby can control the amount of halogens discharged to the outside of the system together with gypsum, and thus can maintain the amount of halogens in the system substantially constant.

The mercury oxidation apparatus is provided with: the denitration apparatus that generates post-denitration exhaust gas by denitrating the combustion apparatus exhaust gas; the non-drainage apparatus that generates halide salt containing exhaust gas by supplying the desulfurization drainage to the flue into which the post-denitration exhaust gas flows; and the dust collection apparatus that removes dust from the halide salt containing exhaust gas. The elemental mercury contained in the combustion apparatus exhaust gas is oxidized by the denitration apparatus using halogens contained in the combustion apparatus exhaust gas. At this time, the exhaust gas treatment method according to the present invention further includes controlling the non-drainage apparatus so that the supply amount, which is the amount of the desulfurization drainage supplied to the flue, changes based on the halogen concentration.

According to such exhaust gas treatment method, the exhaust gas treatment apparatus can discharge halogens to the outside of the system together with the dust, changes the supply amount, which is the amount of the desulfurization drainage supplied to the flue, based on the halogen concentration, thereby can appropriately adjust the discharge amount, which is the amount of halogens discharged to the outside of the system, and thus can maintain the amount of halogens in the system substantially constant.

The exhaust gas treatment apparatus is further provided with the halogen supply apparatus that adds halogens to the desulfurization drainage. At this time, the exhaust gas treatment method according to the present invention further includes controlling the halogen supply apparatus so that the addition amount, which is the amount of halogens added to the desulfurization drainage, changes based on the halogen concentration.

According to such exhaust gas treatment method, the exhaust gas treatment apparatus changes the addition amount, which is the amount of halogens added to the desulfurization drainage, based on the halogen concentration, thereby can appropriately supply halogens in the system, and thus can maintain the halogen concentration substantially constant.

The exhaust gas treatment method according to the present invention further includes measuring a mercury concentration, which is the concentration of mercury contained in post-desulfurization exhaust gas. At this time, the second desulfurization drainage supply apparatus is controlled further based on the mercury concentration.

With such exhaust gas treatment method, the concentration of halogens contained in the combustion apparatus exhaust gas can be changed, and mercury can be removed more reliably from the combustion apparatus exhaust gas.

The exhaust gas treatment method according to the present invention further includes measuring a concentration of halogens contained in post-mercury oxidation exhaust gas. At this time, the second desulfurization drainage supply apparatus is controlled further based on the halogen concentration.

With such exhaust gas treatment method, the concentration of halogens contained in the combustion apparatus exhaust gas can be changed, and mercury can be removed more reliably from the combustion apparatus exhaust gas.

Advantageous Effects of Invention

With the exhaust gas treatment apparatus and the exhaust gas treatment method according to the present invention, even when halogens contained in desulfurization drainage is reused for mercury oxidization, the concentration of halogens in the absorbing liquid of the wet desulfurization apparatus can be adjusted more appropriately, and the post-mercury oxidation exhaust gas can be desulfurized more appropriately.

DESCRIPTION OF EMBODIMENTS

Figure 1:
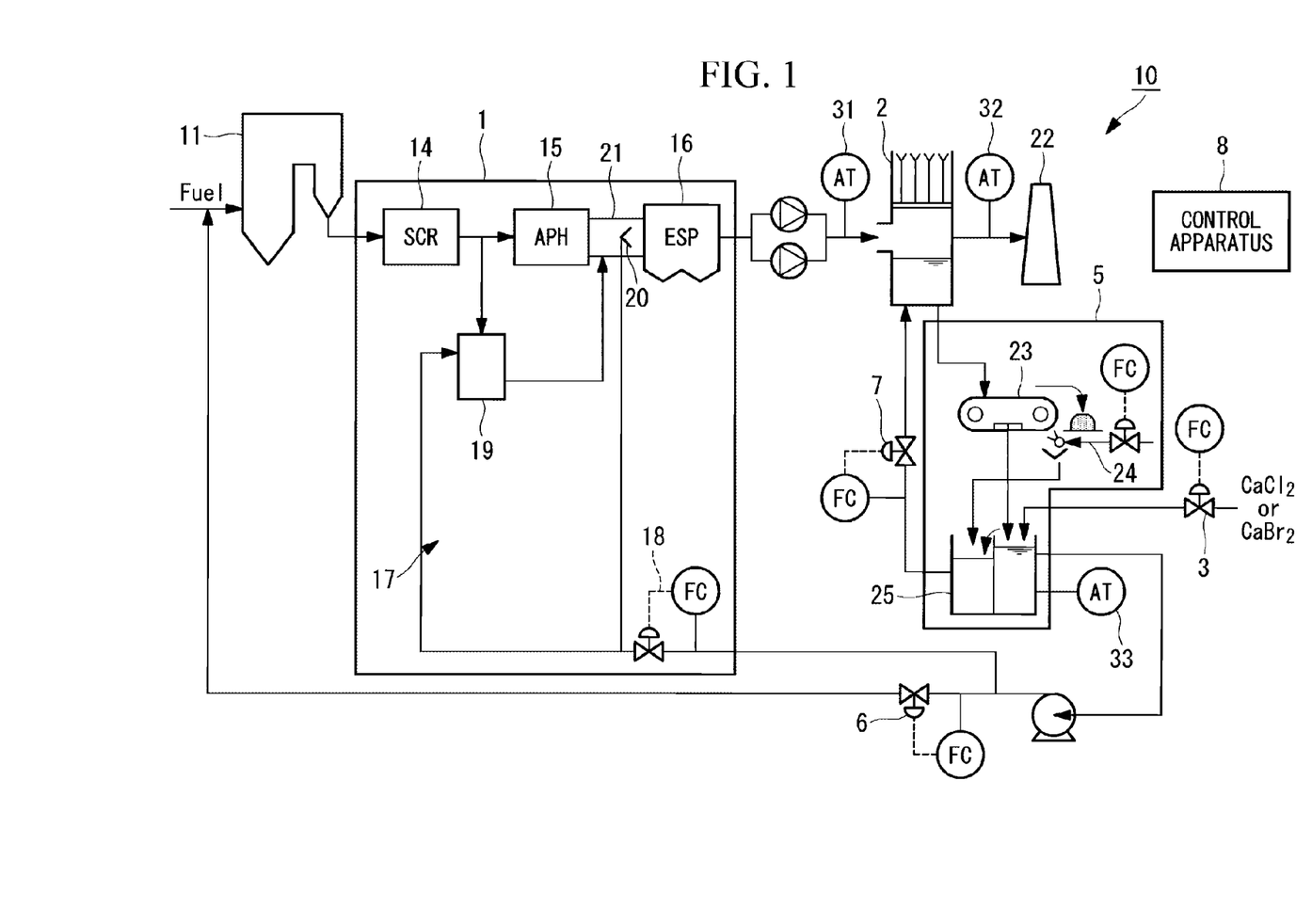
FIG. 1 is a schematic configuration diagram showing an exhaust gas treatment apparatus according to the present invention.

With reference to drawings, there will be described an embodiment of an exhaust gas treatment apparatus according to the present invention. An exhaust gas treatment apparatus 10 is, as shown in FIG. 1, provided with: a mercury oxidation apparatus 1; a wet desulfurization apparatus 2; a halogen addition apparatus 3; a separation apparatus 5; a first desulfurization drainage supply apparatus 6; a second desulfurization drainage supply apparatus 7; and a control apparatus 8, and is utilized for treating exhaust gas exhausted by a boiler 11.

The boiler 11 generates high-pressure steam, and exhausts exhaust gas by combusting coal with which desulfurization drainage supplied from the first desulfurization drainage supply apparatus 6 has been mixed. The exhaust gas contains carbon dioxide $CO_2$, sulfur oxides $SO_x$, nitrogen oxides $NO_x$, elemental mercury $Hg^0$, hydrogen chloride HCl, and dust. The hydrogen chloride HCl is formed from chlorine contained in the coal, or is formed from chlorine contained in the desulfurization drainage. The dust contains soot generated along with combustion of the coal. It is to be noted that the boiler 11 can also make the exhaust gas contain hydrogen chloride by injecting desulfurization drainage supplied from the first desulfurization drainage supply apparatus 6 to the atmosphere in which the coal is combusted. At this time, the hydrogen chloride HCl is generated by chlorine contained in the desulfurization drainage being decomposed down in the atmosphere. Furthermore, the coal can also be replaced by other fuel different from coal. As the fuel, heavy oil is exemplified.

The mercury oxidation apparatus 1 generates exhaust gas containing mercuric oxide by treating the exhaust gas exhausted by the boiler 11. Namely, the mercury oxidation apparatus 1 is provided with: a denitration apparatus 14; an air heater 15; an electrostatic precipitator 16; and a non-drainage apparatus 17.

The denitration apparatus 14 is provided with a denitration catalyst. The denitration catalyst promotes a chemical reaction in which nitrogen $N_2$ is generated by nitrogen oxides $NO_x$ being reduced. The denitration catalyst further promotes a chemical reaction in which mercury chloride and/or mercuric oxide HgO are generated by elemental mercury $Hg^0$ being oxidized. The denitration apparatus 14 denitrates the exhaust gas exhausted by the boiler 11 using the denitration catalyst. The exhaust gas denitrated by the denitration apparatus 14 contains carbon dioxide $CO_2$, sulfur oxide $SO_x$, nitrogen $N_2$, oxidized mercury $Hg^{2+}$, including mercury chloride and mercuric oxide, hydrogen chloride HCl, and dust.

The air heater 15 heats the exhaust gas denitrated by the denitration apparatus 14.

By being controlled by the control apparatus 8, the non-drainage apparatus 17 performs non-drainage treatment of the desulfurization drainage separated by the separation apparatus 5. Namely, the non-drainage apparatus 17 is provided with: a desulfurization drainage supply apparatus 18; a vaporization apparatus 19; and a spray apparatus 20.

By being controlled by the control apparatus 8, the desulfurization drainage supply apparatus 18 supplies the desulfurization drainage separated by the separation apparatus 5 to the vaporization apparatus 19 and the spray apparatus 20.

The vaporization apparatus 19 is formed of a spray dryer. The vaporization apparatus 19 heats the desulfurization drainage supplied from the desulfurization drainage supply apparatus 18 using heat of the exhaust gas denitrated by the denitration apparatus 14, thereby vaporizes the desulfurization drainage, and supplies evaporation residues after vaporization of the desulfurization drainage to a flue 21. The flue 21 forms a flow path through which exhaust gas heated by the air heater 15 is supplied to the electrostatic precipitator 16.

The spray apparatus 20 sprays the desulfurization drainage supplied from the desulfurization drainage supply apparatus 18 into the flue 21. The desulfurization drainage sprayed into the flue 21 is heated by the exhaust gas exiting the air heater 15, and then vaporized. The evaporation residues after vaporization of the desulfurization drainage contain calcium chloride $CaCl_2$.

The electrostatic precipitator 16 removes dust from the exhaust gas exiting the air heater 15. The dust removed by the electrostatic precipitator 16 contains soot generated along with fuel combustion, and further contains calcium chloride $CaCl_2$ contained in the evaporation residues of the desulfurization drainage to which non-drainage treatment has been performed by the non-drainage apparatus 17. The exhaust gas the dust of which has been removed by the electrostatic precipitator 16 contains carbon dioxide $CO_2$, sulfur oxide $SO_x$, nitrogen $N_2$, oxidized mercury $Hg^{2+}$, including mercury chloride, mercuric oxide, and hydrogen chloride HCl. The exhaust gas the dust of which has been removed by the electrostatic precipitator 16 coincides with exhaust gas containing oxidized mercury generated by the mercury oxidation apparatus 1.

The wet desulfurization apparatus 2 is provided with a storage tank and an absorbent spray. The storage tank stores slurry. The slurry contains the absorbing liquid. The absorbing liquid is formed of water solution of lime CaO or limestone $CaCO_3$. The storage tank further mixes desulfurization drainage supplied from the second desulfurization drainage supply apparatus 7 with the slurry. The absorbent spray sprays the slurry stored in the storage tank, thereby makes gas-liquid contact with the slurry the exhaust gas the dust of which has been removed by the electrostatic precipitator 16, and desulfurizes the exhaust gas the dust of which has been removed by the electrostatic precipitator 16. The slurry that has been made gas-liquid contact with the exhaust gas is again stored in the storage tank.

The wet desulfurization apparatus 2 makes gas-liquid contact with the slurry the exhaust gas the dust of which has been removed by the electrostatic precipitator 16, thereby further dissolves mercury and hydrogen chloride, which are contained in the exhaust gas, in the slurry and removes the mercury and the hydrogen chloride from the exhaust gas. At this time, a chloride concentration of the slurry increases by the wet desulfurization apparatus 2 desulfurizing the exhaust gas. Performance of the wet desulfurization apparatus 2 to desulfurize the exhaust gas may deteriorate due to the increase of the chloride concentration of the slurry.

The wet desulfurization apparatus 2 supplies the desulfurized exhaust gas to a chimney 22, and thereby exhausts the exhaust gas to the environment. The wet desulfurization apparatus 2 further supplies the slurry stored in the storage tank to the separation apparatus 5 by a predetermined supply amount.

By being controlled by the control apparatus 8, the halogen addition apparatus 3 supplies calcium chloride $CaCl_2$ to the separation apparatus 5. It is to be noted that the halogen addition apparatus 3 can also supply another additive different from calcium chloride $CaCl_2$ to the separation apparatus 5. As the additive, calcium bromide $CaBr_2$, and a mixture of calcium chloride $CaCl_2$ and calcium bromide $CaBr_2$ are exemplified.

The separation apparatus 5 generates gypsum and desulfurization drainage from the slurry generated by the wet desulfurization apparatus 2. Namely, the separation apparatus 5 is provided with: a belt filter 23; a cleaning apparatus 24; and a drainage container 25.

The belt filter 23 generates gypsum and filtrate by filtering the slurry supplied from the wet desulfurization apparatus 2. The gypsum is formed from calcium sulfate $CaSO_4$, and calcium chloride $CaCl_2$ is attached thereto. The filtrate contains calcium chloride $CaCl_2$.

By being controlled by the control apparatus 8, the cleaning apparatus 24 souses a predetermined amount of cleaning water over the gypsum generated by the belt filter 23, cleans the gypsum, and drains cleaning water drainage. An amount of attached calcium chloride $CaCl_2$ of the cleaned gypsum is smaller as compared with that of the pre-cleaning gypsum. Furthermore, the larger an amount of cleaning water utilized per unit amount of pre-cleaning gypsum, the smaller an amount of calcium chloride $CaCl_2$ attached to the cleaned gypsum. Therefore, the cleaning water drainage contains calcium chloride $CaCl_2$. The larger an amount of cleaning water to be utilized, the larger an amount of cleaning water drainage to be drained. Gypsum cleaned by the cleaning apparatus 24 coincides with gypsum generated by the separation apparatus 5.

The drainage container 25 stores the filtrate generated by the belt filter 23. The drainage container 25 further mixes with the filtrate $CaCl_2$ supplied from the halogen addition apparatus 3 and the cleaning water drainage drained from the cleaning apparatus 24, and thereby generates desulfurization drainage. A concentration of chlorine contained in the desulfurization drainage is smaller than a concentration of chlorine contained in the absorbing liquid of the wet desulfurization apparatus 2. Desulfurization drainage generated by the drainage container 25 coincides with desulfurization drainage generated by the separation apparatus 5.

By being controlled by the control apparatus 8, the first desulfurization drainage supply apparatus 6 supplies the desulfurization drainage generated by the separation apparatus 5 to the boiler 11.

By being controlled by the control apparatus 8, the second desulfurization drainage supply apparatus 7 supplies the desulfurization drainage generated by the separation apparatus 5 to the wet desulfurization apparatus 2.

The exhaust gas treatment apparatus 10 is further provided with: a hydrogen halide concentration measurement apparatus 31; a mercury concentration measurement apparatus 32; and a halogen concentration measurement apparatus 33. By being controlled by the control apparatus 8, the hydrogen halide concentration measurement apparatus 31 measures exhaust gas containing oxidized mercury generated by the mercury oxidation apparatus 1, i.e., a hydrogen halide concentration contained in the exhaust gas the dust of which has been removed by the electrostatic precipitator 16. By being controlled by the control apparatus 8, the mercury concentration measurement apparatus 32 measures a mercury concentration contained in the exhaust gas desulfurized by the wet desulfurization apparatus 2. By being controlled by the control apparatus 8, the halogen concentration measurement apparatus 33 measures a halogen concentration contained in the filtrate generated by the belt filter 23.

Figure 2:
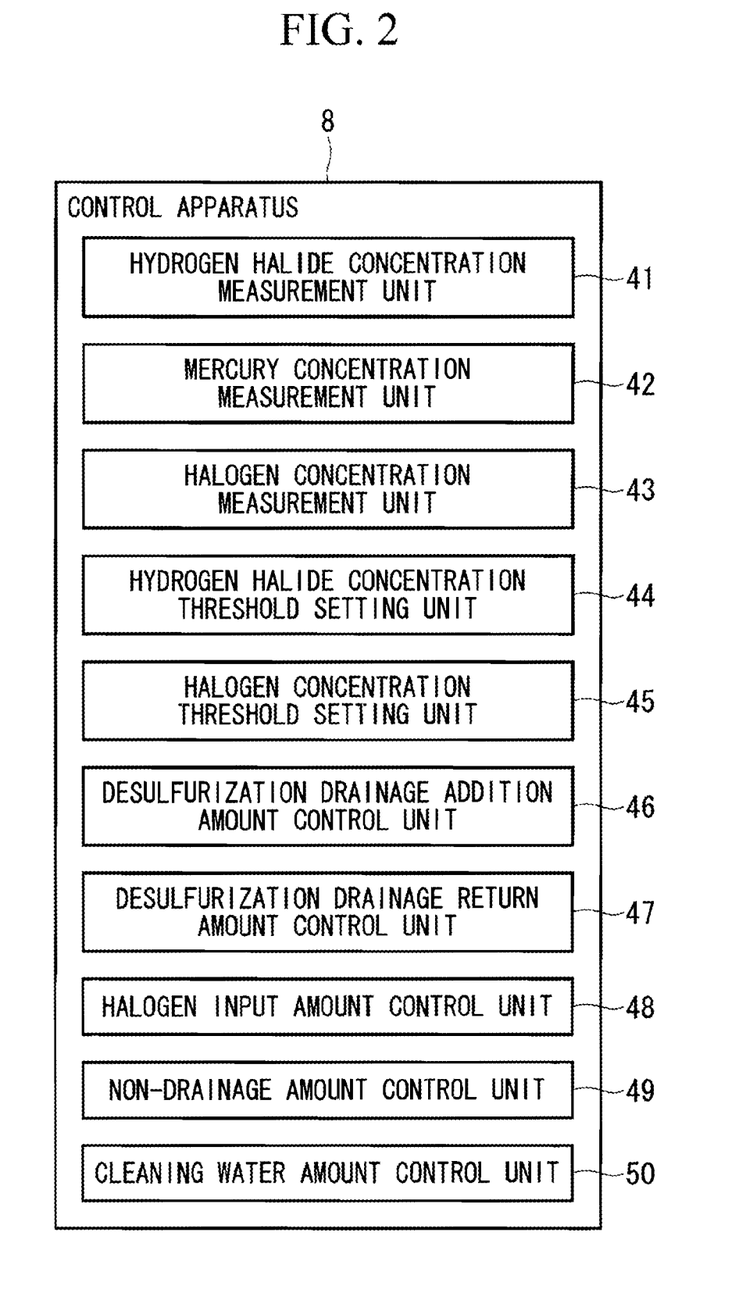
FIG. 2 is a block diagram showing a control apparatus.

FIG. 2 shows the control apparatus 8. The control apparatus 8 is a computer, and is provided with: a CPU; a storage device; a removable memory drive; a communication apparatus; and an interface that are not shown. The CPU executes a computer program installed in the control apparatus 8, and controls the storage device, the removable memory drive, the communication apparatus, and the interface. The storage device records the computer program. The storage device further records information utilized by the CPU. The removable memory drive is utilized when a recording medium on which the computer program is recorded is inserted, and the computer program is installed in the control apparatus 8. The communication apparatus is utilized when downloading a computer program to the control apparatus 8 from another computer connected to the control apparatus 8 through a communication line network, and installing the computer program in the control apparatus 8.

The interface outputs to the CPU information generated by external equipment connected to the control apparatus 8, and outputs the information generated by the CPU to the external equipment. The external equipment includes: the halogen addition apparatus 3; the first desulfurization drainage supply apparatus 6; the second desulfurization drainage supply apparatus 7; the non-drainage apparatus 17 (desulfurization drainage supply apparatus 18); the cleaning apparatus 24; the hydrogen halide concentration measurement apparatus 31; the mercury concentration measurement apparatus 32; and the halogen concentration measurement apparatus 33.

The computer program installed in the control apparatus 8 is formed of a plurality of computer programs for making the control apparatus 8 achieve a plurality of functions, respectively. The plurality of functions include: a hydrogen halide concentration measurement unit 41; a mercury concentration measurement unit 42; a halogen concentration measurement unit 43; a hydrogen halide concentration threshold setting unit 44; a halogen concentration threshold setting unit 45; a desulfurization drainage addition amount control unit 46; a desulfurization drainage return amount control unit 47; a halogen input amount control unit 48; a non-drainage amount control unit 49; and a cleaning water amount control unit 50.

The hydrogen halide concentration measurement unit 41 controls the hydrogen halide concentration measurement apparatus 31 so that measured is a hydrogen chloride concentration contained in the post-mercury oxidation exhaust gas generated by the mercury oxidation apparatus 1, i.e., in the exhaust gas the dust of which has been removed by the electrostatic precipitator 16.

The mercury concentration measurement unit 42 controls the mercury concentration measurement apparatus 32 so that a mercury concentration, which is the concentration of mercury contained in the exhaust gas desulfurized by the wet desulfurization apparatus 2, is measured.

The halogen concentration measurement unit 43 controls the halogen concentration measurement apparatus 33 so that a chlorine concentration, which is the concentration of chlorine contained in the filtrate generated by the belt filter 23, is measured.

In the hydrogen halide concentration threshold setting unit 44, a hydrogen halide concentration threshold initial value is previously set, and the hydrogen halide concentration threshold setting unit 44 calculates a hydrogen chloride concentration threshold based on the mercury concentration measured by the mercury concentration measurement unit 42. Namely, the hydrogen halide concentration threshold setting unit 44 increases the hydrogen chloride concentration threshold, when the hydrogen halide concentration threshold initial value is initially set to the hydrogen chloride concentration threshold, and the mercury concentration measured by the mercury concentration measurement unit 42 is larger than a previously set mercury concentration threshold.

In the halogen concentration threshold setting unit 45, a halogen concentration threshold initial value is previously set, and the halogen concentration threshold setting unit 45 calculates a chlorine concentration threshold based on the hydrogen chloride concentration measured by the hydrogen halide concentration measurement unit 41, the mercury concentration measured by the mercury concentration measurement unit 42, and the hydrogen chloride concentration threshold calculated by the hydrogen halide concentration threshold setting unit 44. Namely, the halogen concentration threshold setting unit 45 decreases the chlorine concentration threshold, when the halogen concentration threshold initial value is initially set to the chlorine concentration threshold, and the hydrogen chloride concentration measured by the hydrogen halide concentration measurement unit 41 is larger than the hydrogen chloride concentration threshold calculated by the hydrogen halide concentration threshold setting unit 44. The halogen concentration threshold setting unit 45 further increases the chlorine concentration threshold, when the mercury concentration measured by the mercury concentration measurement unit 42 is larger than the previously set mercury concentration threshold.

In the desulfurization drainage addition amount control unit 46, a desulfurization drainage addition amount initial value is previously set. The desulfurization drainage addition amount control unit 46 controls the first desulfurization drainage supply apparatus 6 based on the hydrogen chloride concentration measured by the hydrogen halide concentration measurement unit 41, the mercury concentration measured by the mercury concentration measurement unit 42, the chlorine concentration measured by the halogen concentration measurement unit 43, the hydrogen chloride concentration threshold calculated by the hydrogen halide concentration threshold setting unit 44, and the chlorine concentration threshold calculated by the halogen concentration threshold setting unit 45. Namely, the desulfurization drainage addition amount control unit 46 controls the first desulfurization drainage supply apparatus 6 so that a desulfurization drainage addition amount, which is the amount of desulfurization drainage supplied to the boiler 11, the desulfurization drainage being generated by the separation apparatus 5, becomes equal to the desulfurization drainage addition amount initial value. The desulfurization drainage addition amount control unit 46 further controls the first desulfurization drainage supply apparatus 6 so that the desulfurization drainage addition amount, which is the amount of desulfurization drainage supplied to the boiler 11, the desulfurization drainage being generated by the separation apparatus 5, increases when the chlorine concentration measured by the halogen concentration measurement unit 43 is larger than the chlorine concentration threshold calculated by the halogen concentration threshold setting unit 45. The desulfurization drainage addition amount control unit 46 further controls the first desulfurization drainage supply apparatus 6 so that the desulfurization drainage addition amount, which is the amount of desulfurization drainage supplied to the boiler 11, the desulfurization drainage being generated by the separation apparatus 5, decreases when the chlorine concentration measured by the halogen concentration measurement unit 43 is smaller than the chlorine concentration threshold calculated by the halogen concentration threshold setting unit 45.

The desulfurization drainage addition amount control unit 46 further controls the first desulfurization drainage supply apparatus 6 so that the desulfurization drainage addition amount, which is the amount of desulfurization drainage supplied to the boiler 11, the desulfurization drainage being generated by the separation apparatus 5, decreases when the hydrogen chloride concentration measured by the hydrogen halide concentration measurement unit 41 is larger than the hydrogen chloride concentration threshold calculated by the hydrogen halide concentration threshold setting unit 44. The desulfurization drainage addition amount control unit 46 further controls the first desulfurization drainage supply apparatus 6 so that the desulfurization drainage addition amount, which is the amount of desulfurization drainage supplied to the boiler 11, the desulfurization drainage being generated by the separation apparatus 5, increases when the mercury concentration measured by the mercury concentration measurement unit 42 is larger than the previously set mercury concentration threshold.

In the desulfurization drainage return amount control unit 47, a desulfurization drainage addition amount initial value is previously set, and the desulfurization drainage return amount control unit 47 controls the second desulfurization drainage supply apparatus 7 based on the chlorine concentration measured by the halogen concentration measurement unit 43 and the chlorine concentration threshold calculated by the halogen concentration threshold setting unit 45. Namely, the desulfurization drainage return amount control unit 47 controls the second desulfurization drainage supply apparatus 7 so that a desulfurization drainage return amount, which is the amount of desulfurization drainage supplied to the wet desulfurization apparatus 2, the desulfurization drainage being generated by the separation apparatus 5, becomes equal to the desulfurization drainage addition amount initial value. The desulfurization drainage return amount control unit 47 further controls the second desulfurization drainage supply apparatus 7 so that the desulfurization drainage return amount, which is the amount of desulfurization drainage supplied to the wet desulfurization apparatus 2, the desulfurization drainage being generated by the separation apparatus 5, decreases when the chlorine concentration measured by the halogen concentration measurement unit 43 is larger than the chlorine concentration threshold calculated by the halogen concentration threshold setting unit 45. The desulfurization drainage return amount control unit 47 further controls the second desulfurization drainage supply apparatus 7 so that the desulfurization drainage return amount, which is the amount of desulfurization drainage supplied to the wet desulfurization apparatus 2, the desulfurization drainage being generated by the separation apparatus 5, increases when the chlorine concentration measured by the halogen concentration measurement unit 43 is smaller than the chlorine concentration threshold calculated by the halogen concentration threshold setting unit 45.

In the halogen input amount control unit 48, a halogen input amount initial value is previously set, and the halogen input amount control unit 48 controls the halogen addition apparatus 3 based on the chlorine concentration measured by the halogen concentration measurement unit 43 and the chlorine concentration threshold calculated by the halogen concentration threshold setting unit 45. Namely, the halogen input amount control unit 48 controls the halogen addition apparatus 3 so that a halogen input amount, which is the amount of calcium chloride $CaCl_2$ supplied to the drainage container 25, becomes equal to the halogen input amount initial value. The halogen input amount control unit 48 further controls the halogen addition apparatus 3 so that the halogen input amount, which is the amount of calcium chloride $CaCl_2$ supplied to the drainage container 25, increases when the chlorine concentration measured by the halogen concentration measurement unit 43 is smaller than the chlorine concentration threshold calculated by the halogen concentration threshold setting unit 45.

In the non-drainage amount control unit 49, a non-drainage amount initial value is previously set, and the non-drainage amount control unit 49 controls the desulfurization drainage supply apparatus 18 based on the chlorine concentration measured by the halogen concentration measurement unit 43 and the chlorine concentration threshold calculated by the halogen concentration threshold setting unit 45. Namely, the non-drainage amount control unit 49 controls the desulfurization drainage supply apparatus 18 so that a non-drainage amount, which is the amount of desulfurization drainage to which non-drainage is performed, the desulfurization drainage being generated by the separation apparatus 5, becomes equal to the non-drainage amount initial value. The non-drainage amount control unit 49 further controls the desulfurization drainage supply apparatus 18 so that the non-drainage amount, which is the amount of desulfurization drainage to which non-drainage is performed, the desulfurization drainage being generated by the separation apparatus 5, increases when the chlorine concentration measured by the halogen concentration measurement unit 43 is larger than the chlorine concentration threshold calculated by the halogen concentration threshold setting unit 45.

In the cleaning water amount control unit 50, a cleaning water amount initial value is previously set, and the cleaning water amount control unit 50 controls the cleaning apparatus 24 based on the chlorine concentration measured by the halogen concentration measurement unit 43 and the chlorine concentration threshold calculated by the halogen concentration threshold setting unit 45. Namely, the cleaning water amount control unit 50 controls the cleaning apparatus 24 so that a cleaning water amount, which is the amount of cleaning water utilized for cleaning the gypsum filtered by the belt filter 23, becomes equal to the cleaning water amount initial value. The cleaning water amount control unit 50 further controls the cleaning apparatus 24 so that the cleaning water amount, which is the amount of cleaning water utilized for cleaning the gypsum filtered by the belt filter 23, decreases when the chlorine concentration measured by the halogen concentration measurement unit 43 is larger than the chlorine concentration threshold calculated by the halogen concentration threshold setting unit 45.

The embodiment of the exhaust gas treatment method according to the present invention is executed by the control apparatus 8 using the exhaust gas treatment apparatus 10. In the middle of the exhaust gas treatment apparatus 10 treating the exhaust gas exhausted from the boiler 11, the control apparatus 8 first controls the first desulfurization drainage supply apparatus 6, and thereby supplies desulfurization drainage to the boiler 11 so that the desulfurization drainage generated by the separation apparatus 5 becomes equal to the desulfurization drainage addition amount initial value, which is the amount of the desulfurization drainage supplied to the boiler 11 per unit time. By controlling the second desulfurization drainage supply apparatus 7, the control apparatus 8 supplies desulfurization drainage to the wet desulfurization apparatus 2 so that a desulfurization drainage return amount, which is the amount of desulfurization drainage supplied to the wet desulfurization apparatus 2 per unit time, becomes equal to the desulfurization drainage addition amount initial value. By controlling the halogen addition apparatus 3, the control apparatus 8 supplies calcium chloride $CaCl_2$ to the drainage container 25 so that the halogen input amount, which is the amount of calcium chloride $CaCl_2$ supplied to the drainage container 25 per unit time, becomes equal to the halogen input amount initial value. By controlling the non-drainage apparatus 17, the control apparatus 8 performs non-drainage of the desulfurization drainage so that the non-drainage amount, which is the amount of desulfurization drainage to which non-drainage is performed per unit time, the desulfurization drainage being generated by the separation apparatus 5, becomes equal to the non-drainage amount initial value. By controlling the cleaning apparatus 24, the control apparatus 8 cleans gypsum so that the cleaning water amount, which is the amount of cleaning water utilized for cleaning the gypsum filtered by the belt filter 23 per unit time, becomes equal to the cleaning water amount initial value. The control apparatus 8 further sets the hydrogen halide concentration threshold initial value as the hydrogen chloride concentration threshold, and sets the halogen concentration threshold initial value as the chlorine concentration threshold.

By controlling the hydrogen halide concentration measurement apparatus 31, the control apparatus 8 measures the hydrogen chloride concentration contained in the exhaust gas the dust of which has been removed by the electrostatic precipitator 16. By controlling the mercury concentration measurement apparatus 32, the control apparatus 8 further measures the mercury concentration, which is the concentration of mercury contained in the exhaust gas desulfurized by the wet desulfurization apparatus 2. By controlling the halogen concentration measurement apparatus 33, the control apparatus 8 further measures the chlorine concentration, which is the concentration of chlorine contained in the filtrate generated by the belt filter 23.

When the mercury concentration measured by the mercury concentration measurement apparatus 32 is larger than the mercury concentration threshold, the control apparatus 8 increases the hydrogen chloride concentration threshold, and increases the chlorine concentration threshold. When the hydrogen chloride concentration measured by the hydrogen halide concentration measurement apparatus 31 is larger than the hydrogen chloride concentration threshold, the control apparatus 8 decreases the chlorine concentration threshold.

When the chlorine concentration measured by the halogen concentration measurement apparatus 33 is larger than the chlorine concentration threshold, the control apparatus 8 increases the desulfurization drainage addition amount, which is the amount of desulfurization drainage supplied to the boiler 11 per unit time, by controlling the first desulfurization drainage supply apparatus 6. When the chlorine concentration measured by the halogen concentration measurement apparatus 33 is smaller than the chlorine concentration threshold, the control apparatus 8 further decreases the desulfurization drainage addition amount, which is the amount of desulfurization drainage supplied to the boiler 11 per unit time, by controlling the first desulfurization drainage supply apparatus 6.

When the hydrogen chloride concentration measured by the hydrogen halide concentration measurement unit 41 is larger than the hydrogen chloride concentration threshold calculated by the hydrogen halide concentration threshold setting unit 44, the control apparatus 8 further decreases the desulfurization drainage addition amount, which is the amount of desulfurization drainage supplied to the boiler 11 per unit time, by controlling the first desulfurization drainage supply apparatus 6. When the mercury concentration measured by the mercury concentration measurement unit 42 is larger than the previously set mercury concentration threshold, the control apparatus 8 further increases the desulfurization drainage addition amount, which is the amount of desulfurization drainage supplied to the boiler 11 per unit time, by controlling the first desulfurization drainage supply apparatus 6.

According to such operation, the exhaust gas treatment apparatus 10 supplies the desulfurization drainage generated by the separation apparatus 5 to the boiler 11, and thereby can make the exhaust gas exhausted by the boiler 11 contain hydrogen chloride. Therefore, the exhaust gas treatment apparatus 10 can oxidize mercury contained in the exhaust gas exhausted by the boiler 11 by the denitration apparatus 14, and can remove mercury from the exhaust gas exhausted by the boiler 11 more appropriately. The exhaust gas treatment apparatus 10 supplies the desulfurization drainage generated by the separation apparatus 5 to the boiler 11, and thereby can further reduce an amount of halogens supplied to the denitration apparatus 14 separately from the desulfurization drainage.

According to such operation, the exhaust gas treatment apparatus 10 further increases and decreases the desulfurization drainage addition amount, which is the amount of desulfurization drainage supplied to the boiler 11, and thereby can appropriately adjust the concentration of hydrogen chloride contained in the exhaust gas exhausted by the boiler 11. Therefore, the exhaust gas treatment apparatus 10 can appropriately oxidize elemental mercury contained in the exhaust gas exhausted by the boiler 11, and can appropriately remove mercury from the exhaust gas.

When the chlorine concentration measured by the halogen concentration measurement apparatus 33 is larger than the chlorine concentration threshold, the control apparatus 8 decreases the desulfurization drainage return amount, which is the amount of desulfurization drainage supplied to the wet desulfurization apparatus 2 per unit time, by controlling the second desulfurization drainage supply apparatus 7. When the chlorine concentration measured by the halogen concentration measurement apparatus 33 is smaller than the chlorine concentration threshold, the control apparatus 8 further increases the desulfurization drainage return amount, which is the amount of desulfurization drainage supplied to the wet desulfurization apparatus 2 per unit time, by controlling the second desulfurization drainage supply apparatus 7.

According to such operation, the exhaust gas treatment apparatus 10 increases and decreases the desulfurization drainage return amount, which is the amount of desulfurization drainage supplied to the wet desulfurization apparatus 2, based on the chlorine concentration of the desulfurization drainage, thereby can appropriately adjust a concentration of chlorine in the absorbing liquid of the wet desulfurization apparatus 2, and the wet desulfurization apparatus 2 can desulfurize the exhaust gas more appropriately. Namely, according to such operation, the exhaust gas treatment apparatus 10 can maintain the absorbing liquid so that the concentration of chlorine in the absorbing liquid of the wet desulfurization apparatus 2 is smaller than a predetermined concentration, and the wet desulfurization apparatus 2 can desulfurize the exhaust gas more appropriately.

When the chlorine concentration measured by the halogen concentration measurement apparatus 33 is smaller than the chlorine concentration threshold, the control apparatus 8 increases the halogen input amount, which is the amount of calcium chloride $CaCl_2$ supplied to the drainage container 25, by controlling the halogen addition apparatus 3.

The concentration of chlorine in the filtrate generated by the belt filter 23 decreases, when an amount of chlorine in the system reduces. According to such operation, the exhaust gas treatment apparatus 10 can increase chlorine in the system, when the amount of chlorine in the system decreases. Therefore, by increasing chlorine in the system, the exhaust gas treatment apparatus 10 can increase a concentration of hydrogen chloride contained in the exhaust gas exhausted by the boiler 11, can appropriately oxidize elemental mercury contained in the exhaust gas exhausted by the boiler 11, and can appropriately remove mercury from the exhaust gas.

When the chlorine concentration measured by the halogen concentration measurement apparatus 33 is larger than the chlorine concentration threshold, the control apparatus 8 increases the non-drainage amount, which is the amount of desulfurization drainage to which non-drainage is performed, by controlling the non-drainage apparatus 17.

The concentration of chlorine in the filtrate generated by the belt filter 23 increases, when the amount of chlorine in the system increases. According to such operation, the exhaust gas treatment apparatus 10 can decrease chlorine in the system, when the amount of chlorine in the system increases. Therefore, by decreasing chlorine in the system, the exhaust gas treatment apparatus 10 can maintain the absorbing liquid so that the concentration of chlorine in the absorbing liquid of the wet desulfurization apparatus 2 is smaller than the predetermined concentration, and the wet desulfurization apparatus 2 can desulfurize the exhaust gas more appropriately.

When the chlorine concentration measured by the halogen concentration measurement apparatus 33 is larger than the chlorine concentration threshold, the control apparatus 8 decreases the cleaning water amount, which is the amount of cleaning water utilized for cleaning the gypsum filtered by the belt filter 23, by controlling the cleaning apparatus 24.

According to such operation, the exhaust gas treatment apparatus can increase and decrease an amount of chlorine discharged to the outside of the system together with the gypsum by increasing and decreasing the cleaning water amount. Therefore, by increasing and decreasing chlorine in the system, the exhaust gas treatment apparatus 10 can remove mercury from the exhaust gas more appropriately, and can desulfurize the exhaust gas more appropriately. For example, by decreasing the cleaning water amount, the exhaust gas treatment apparatus 10 can maintain the absorbing liquid so that the concentration of chlorine in the absorbing liquid of the wet desulfurization apparatus 2 is smaller than the predetermined concentration, and can desulfurize the exhaust gas more appropriately. By increasing the cleaning water amount, the exhaust gas treatment apparatus 10 can increase the concentration of hydrogen chloride contained in the exhaust gas exhausted by the boiler 11, and can appropriately remove mercury from the exhaust gas.

It is to be noted that with another algorithm based on the hydrogen chloride concentration, mercury concentration, and chlorine concentration, the control apparatus 8 can also control the halogen addition apparatus 3, the first desulfurization drainage supply apparatus 6, the second desulfurization drainage supply apparatus 7, the non-drainage apparatus 17, and the cleaning apparatus 24. As the control, applied are control in which the desulfurization drainage return amount is increased and decreased based on the chlorine concentration so that the chlorine concentration in the absorbing liquid of the wet desulfurization apparatus 2 is an appropriate one, and control in which the amount of chlorine present in the system is maintained in a predetermined range. Similarly to the exhaust gas treatment apparatus 10 in the existing embodiment, the exhaust gas treatment apparatus to which such control has been applied can also appropriately remove mercury from the exhaust gas, and can appropriately desulfurize the exhaust gas.

It is to be noted that the exhaust gas treatment apparatus 10 can also control the first desulfurization drainage supply apparatus 6 so that the desulfurization drainage addition amount, which is the amount of desulfurization drainage supplied to the boiler 11 per unit time, the desulfurization drainage being generated by the separation apparatus 5, does not increase and decrease. Similarly to the exhaust gas treatment apparatus 10 in the existing embodiment, such exhaust gas treatment apparatus can appropriately remove mercury from the exhaust gas, and can appropriately desulfurize the exhaust gas, by supplying desulfurization drainage to the boiler 11, and increasing and decreasing the desulfurization drainage return amount, which is the amount of desulfurization drainage supplied to the wet desulfurization apparatus 2.

It is to be noted that the exhaust gas treatment apparatus 10 can also control the cleaning apparatus 24 so that the cleaning water amount, which is the amount of cleaning water utilized for cleaning the gypsum filtered by the belt filter 23 per unit time (unit amount of gypsum), does not increase and decrease. Similarly to the exhaust gas treatment apparatus 10 in the existing embodiment, such exhaust gas treatment apparatus can appropriately remove mercury from the exhaust gas, and can appropriately desulfurize the exhaust gas, by supplying desulfurization drainage to the boiler 11, and increasing and decreasing the desulfurization drainage return amount, which is the amount of desulfurization drainage supplied to the wet desulfurization apparatus 2.

It is to be noted that the halogen addition apparatus 3 can be omitted in the exhaust gas treatment apparatus 10. The exhaust gas treatment apparatus in which the halogen addition apparatus 3 is omitted can be applied when chlorine is sufficiently present in the system, and for example, it is suitable when fuel sufficiently containing chlorine is supplied to the boiler 11. Similarly to the exhaust gas treatment apparatus 10 in the existing embodiment, such exhaust gas treatment apparatus can appropriately remove mercury from the exhaust gas, and can appropriately desulfurize the exhaust gas, by supplying desulfurization drainage to the boiler 11, and increasing and decreasing the desulfurization drainage return amount, which is the amount of desulfurization drainage supplied to the wet desulfurization apparatus 2.

It is to be noted that the non-drainage apparatus 17 can be omitted in the exhaust gas treatment apparatus 10. The exhaust gas treatment apparatus in which the non-drainage apparatus 17 is omitted is suitable when the concentration of chlorine in fuel supplied to the boiler 11 is extremely small. Similarly to the exhaust gas treatment apparatus 10 in the existing embodiment, such exhaust gas treatment apparatus can appropriately remove mercury from the exhaust gas, and can appropriately desulfurize the exhaust gas, by supplying desulfurization drainage to the boiler 11, and increasing and decreasing the desulfurization drainage return amount, which is the amount of desulfurization drainage supplied to the wet desulfurization apparatus 2, It is to be noted that the hydrogen chloride concentration measured by the hydrogen halide concentration measurement apparatus 31 can also be replaced by the hydrogen halide concentration in the exhaust gas the dust of which has been removed by the electrostatic precipitator 16. The chlorine concentration measured by the halogen concentration measurement apparatus 33 can also be replaced by the halogen concentration in the filtrate generated by the belt filter 23. As the halogens, fluorine, bromine, and iodine are exemplified. Similarly to the exhaust gas treatment apparatus 10 in the existing embodiment, such exhaust gas treatment apparatus can also appropriately remove mercury from the exhaust gas, and can appropriately desulfurize the exhaust gas.

It is to be noted that the hydrogen halide concentration measurement apparatus 31 can be omitted in the exhaust gas treatment apparatus 10. The mercury concentration measurement apparatus 32 can be omitted in the exhaust gas treatment apparatus 10. Similarly to the exhaust gas treatment apparatus 10 in the existing embodiment, the exhaust gas treatment apparatus to which such control is applied can also appropriately remove mercury from the exhaust gas, and can appropriately desulfurize the exhaust gas, by increasing and decreasing the desulfurization drainage return amount based on the chlorine concentration so that the chlorine concentration in the absorbing liquid of the wet desulfurization apparatus 2 is an appropriate one, and maintaining the amount of chlorine present in the system in the predetermined range.

REFERENCE SIGNS LIST

1 Mercury oxidation apparatus
2 Wet desulfurization apparatus
3 Halogen addition apparatus
5 Separation apparatus
6 First desulfurization drainage supply apparatus
7 Second desulfurization drainage supply apparatus
8 Control apparatus
10 Exhaust gas treatment apparatus
11 Boiler
14 Denitration apparatus
15 Air heater
16 Electrostatic precipitator
17 Non-drainage apparatus
18 Desulfurization drainage supply apparatus
19 Vaporization apparatus
20 Spray apparatus
21 Flue
22 Chimney
23 Belt filter
24 Cleaning apparatus
31 Hydrogen halide concentration measurement apparatus
32 Mercury concentration measurement apparatus
33 Halogen concentration measurement apparatus

The invention claimed is:

1. An exhaust gas treatment apparatus comprising:
a mercury oxidation apparatus that generates post-mercury oxidation exhaust gas from combustion apparatus exhaust gas generated by a combustion apparatus;
a wet desulfurization apparatus that generates post-desulfurization exhaust gas and slurry from the post-mercury oxidation exhaust gas;
a separation apparatus that generates gypsum and desulfurization drainage from the slurry;
a first desulfurization drainage supply apparatus that supplies the desulfurization drainage to the combustion apparatus;
a second desulfurization drainage supply apparatus that supplies the desulfurization drainage to the wet desulfurization apparatus;
a halogen concentration sensor that measures a halogen concentration, which is the concentration of halogens contained in filtrate generated by the slurry being filtered; and
a control apparatus that controls the second desulfurization drainage supply apparatus so that a supply amount, which is the amount of the desulfurization drainage supplied to the wet desulfurization apparatus, changes based on the halogen concentration,
wherein the combustion apparatus generates the combustion apparatus exhaust gas by combusting fuel together with the desulfurization drainage, and
wherein the post-mercury oxidation exhaust gas contains mercury oxidized by halogens contained in the combustion apparatus exhaust gas, and is desulfurized by the wet desulfurization apparatus using an absorbing liquid with which the desulfurization drainage has been mixed.

2. The exhaust gas treatment apparatus according to claim 1, wherein the control apparatus further controls the first desulfurization drainage supply apparatus so that a supply amount, which is the amount of the desulfurization drainage supplied to the combustion apparatus, changes based on the halogen concentration.

3. The exhaust gas treatment apparatus according to claim 2, wherein the separation apparatus includes:
a filtration apparatus that generates the filtrate and pre-cleaning gypsum by filtering the slurry;
a cleaning apparatus that generates cleaning water drainage and the gypsum by cleaning the pre-cleaning gypsum using cleaning water; and a drainage container that generates the desulfurization drainage by mixing the cleaning water drainage and the filtrate, and wherein the control apparatus controls the cleaning apparatus so that an amount of the cleaning water utilized per unit amount of the pre-cleaning gypsum changes based on the halogen concentration.

4. The exhaust gas treatment apparatus according to claim 3, wherein the mercury oxidation apparatus includes:

a denitration apparatus that generates post-denitration exhaust gas by denitrating the combustion apparatus exhaust gas;

a non-drainage apparatus that generates halide salt containing exhaust gas by supplying the desulfurization drainage to a flue into which the post-denitration exhaust gas flows; and a dust collection apparatus that generates the post-mercury oxidation exhaust gas by removing dust from the halide salt containing exhaust gas, and wherein elemental mercury contained in the combustion apparatus exhaust gas is oxidized by the denitration apparatus using halogens contained in the combustion apparatus exhaust gas, and wherein the control apparatus further controls the non-drainage apparatus so that a supply amount, which is the amount of the desulfurization drainage supplied to the flue, changes based on the halogen concentration.

5. The exhaust gas treatment apparatus according to claim 4, further comprising a halogen supply apparatus that adds halogens to the desulfurization drainage, wherein the control apparatus controls the halogen supply apparatus so that an addition amount, which is the amount of halogens added to the desulfurization drainage, changes based on the halogen concentration.

6. The exhaust gas treatment apparatus according to claim 5, further comprising a mercury concentration sensor that measures a mercury concentration, which is the concentration of mercury contained in the post-desulfurization exhaust gas, wherein the control apparatus controls the second desulfurization drainage supply apparatus further based on the mercury concentration.

7. The exhaust gas treatment apparatus according to claim 6, further comprising another halogen concentration sensor that measures a concentration of halogens contained in the post-mercury oxidation exhaust gas, wherein the control apparatus controls the second desulfurization drainage supply apparatus further based on the concentration.

8. An exhaust gas treatment method that is executed using an exhaust gas treatment apparatus, the exhaust gas treatment apparatus comprising:

a mercury oxidation apparatus that generates post-mercury oxidation exhaust gas from combustion apparatus exhaust gas generated by a combustion apparatus;

a wet desulfurization apparatus that generates post-desulfurization exhaust gas and slurry from the post-mercury oxidation exhaust gas;

a separation apparatus that generates gypsum and desulfurization drainage from the slurry;

a first desulfurization drainage supply apparatus that supplies the desulfurization drainage to the combustion apparatus; and a second desulfurization drainage supply apparatus that supplies the desulfurization drainage to the wet desulfurization apparatus, wherein the combustion apparatus generates the combustion apparatus exhaust gas by combusting fuel together with the desulfurization drainage, and wherein the post-mercury oxidation exhaust gas contains mercury oxidized by halogens contained in the combustion apparatus exhaust gas, and is desulfurized by the wet desulfurization apparatus using an absorbing liquid with which the desulfurization drainage has been mixed, the exhaust gas treatment method comprising:

measuring a halogen concentration, which is the concentration of halogens contained in filtrate generated by the slurry being filtered; and controlling the second desulfurization drainage supply apparatus so that a supply amount, which is the amount of the desulfurization drainage supplied to the wet desulfurization apparatus, changes based on the halogen concentration.

9. The exhaust gas treatment method according to claim 8, further comprising controlling the first desulfurization drainage supply apparatus so that a supply amount, which is the amount of the desulfurization drainage supplied to the combustion apparatus, changes based on the halogen concentration.

10. The exhaust gas treatment method according to claim 9, wherein the separation apparatus includes:

a filtration apparatus that generates the filtrate and pre-cleaning gypsum by filtering the slurry;

a cleaning apparatus that generates cleaning water drainage and the gypsum by cleaning the pre-cleaning gypsum using cleaning water; and a drainage container that generates the desulfurization drainage by mixing the cleaning water drainage and the filtrate, and further wherein the exhaust gas treatment method comprises controlling the cleaning apparatus so that an amount of the cleaning water utilized per unit amount of the pre-cleaning gypsum changes based on the halogen concentration.

11. The exhaust gas treatment method according to claim 10, wherein the mercury oxidation apparatus includes:

a denitration apparatus that generates post-denitration exhaust gas by denitrating the combustion apparatus exhaust gas;

a non-drainage apparatus that generates halide salt containing exhaust gas by supplying the desulfurization drainage to a flue into which the post-denitration exhaust gas flows; and a dust collection apparatus that generates the post-mercury oxidation exhaust gas by removing dust from the halide salt containing exhaust gas, and wherein elemental mercury contained in the combustion apparatus exhaust gas is oxidized by the denitration apparatus using halogens contained in the combustion apparatus exhaust gas, and further wherein the exhaust gas treatment method comprises controlling the non-drainage apparatus so that a supply amount, which is the amount of the desulfurization drainage supplied to the flue, changes based on the halogen concentration.

12. The exhaust gas treatment method according to claim 11, wherein the exhaust gas treatment apparatus further comprises a halogen supply apparatus that adds halogens to the desulfurization drainage, and further wherein the exhaust gas treatment method comprises controlling the halogen supply apparatus so that an addition amount, which is the amount of halogens added to the desulfurization drainage, changes based on the halogen concentration.

13. The exhaust gas treatment method according to claim 12, further comprising measuring a mercury concentration, which is the concentration of mercury contained in the post-desulfurization exhaust gas,
wherein the second desulfurization drainage supply apparatus is controlled further based on the mercury concentration.

14. The exhaust gas treatment method according to claim 13, further comprising measuring a concentration of halogens contained in the post-mercury oxidation exhaust gas,
wherein the second desulfurization drainage supply apparatus is controlled further based on the concentration.

* * * * *